United States Patent
Hsueh et al.

(10) Patent No.: US 9,270,136 B2
(45) Date of Patent: Feb. 23, 2016

(54) CHARGING CONTROL CIRCUIT

(71) Applicant: Primax Electronics Ltd., Neihu, Taipei (TW)

(72) Inventors: Tsung-Wen Hsueh, Taipei (TW); Yi-Guang Chen, Taipei (TW); Yu Yen Shih, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 162 days.

(21) Appl. No.: 14/227,219

(22) Filed: Mar. 27, 2014

(65) Prior Publication Data

US 2015/0214772 A1 Jul. 30, 2015

(30) Foreign Application Priority Data

Jan. 24, 2014 (TW) .............................. 103102633 A

(51) Int. Cl.
*H02J 7/00* (2006.01)
*H02J 7/02* (2006.01)

(52) U.S. Cl.
CPC ............... *H02J 7/0072* (2013.01); *H02J 7/025* (2013.01); *H02J 7/0052* (2013.01)

(58) Field of Classification Search
CPC ............................... Y02E 60/12; H02J 7/0072
USPC ........................................................ 320/107
See application file for complete search history.

(56) References Cited

U.S. PATENT DOCUMENTS

| | | | | | |
|---|---|---|---|---|---|
| 4,242,627 | A | * | 12/1980 | Kisiel | H02J 7/008 320/143 |
| 5,289,101 | A | * | 2/1994 | Furuta | H02J 7/022 320/145 |
| 8,749,193 | B1 | * | 6/2014 | Sullivan | H02J 1/08 307/10.7 |
| 2004/0164708 | A1 | * | 8/2004 | Veselic | H02J 7/0068 320/132 |
| 2008/0252262 | A1 | * | 10/2008 | Buhler | H02J 7/0072 320/149 |
| 2012/0235623 | A1 | * | 9/2012 | Ishino | H01M 10/44 320/101 |
| 2015/0130419 | A1 | * | 5/2015 | Zhai | H02J 7/0073 320/112 |
| 2015/0188330 | A1 | * | 7/2015 | Nakamoto | H02J 7/007 320/106 |

* cited by examiner

*Primary Examiner* — Suresh Memula
(74) *Attorney, Agent, or Firm* — Kirton McConkie; Evan R. Witt

(57) ABSTRACT

A charging control circuit includes a charging module, a switch element, a load detecting element, and an adjusting element. According to the power consumption of a chargeable battery of an electronic device, the load detecting element issues a load range signal. According to the load range signal, the adjusting element issues a control voltage to the switch element. According to the control voltage, the switch element is turned on, and the magnitude of a control current from the switch element is correspondingly adjusted. By the charging module, a charging current corresponding to the control current is provided to charge the chargeable battery. Consequently, the magnitude of the charging current is controlled according to the operating situation of the electronic device, and the charging speed is changed.

9 Claims, 2 Drawing Sheets

CHARGING CONTROL CIRCUIT

FIELD OF THE INVENTION

The present invention relates to a charging control circuit, and more particularly to a charging control circuit for charging a chargeable battery of an electronic device.

BACKGROUND OF THE INVENTION

In modern societies, computers become essential apparatuses in our daily lives. Moreover, peripheral electronic devices such as input devices (e.g. mouse devices or keyboards) are important accessories of computers. During operations, these peripheral electronic devices are connected to the computer through connecting wires to acquire electric power. Due to the limitations of the connecting wires, these peripheral electronic devices have to be operated at the positions near the computer in order to acquire the electric power from the computer. For solving this drawback, a wireless electronic device is introduced into the market. For operating the wireless electronic device, it is not necessary to place the wireless electronic device near the computer.

Generally, a battery is usually installed in the wireless electronic device. The battery is a chargeable battery for providing electric power to the wireless electronic device. By acquiring the electric power from the battery, the wireless electronic device can be normally operated without being restricted by the connecting wire. In case that the residual battery capacity of the chargeable battery is zero or very low, the chargeable battery needs to be charged, so that the wireless electronic device can be continuously operated. Generally, the wireless electronic device comprises a charging module for charging the chargeable battery. Conventionally, the charging module may transfer a fixed charging current to the chargeable battery in order to charge the chargeable battery. A higher magnitude of the charging current denotes a shorter charging time. Whereas, a lower magnitude of the charging current denotes a longer charging time.

A controlling device for adjusting a charging current with a system load was disclosed in Taiwanese Patent Publication No. TW440760. The controlling device is used for controlling a power source to provide the charging current to the chargeable battery. The controlling device comprises a current sensing element, a voltage conversion circuit, and a charging current adjusting circuit. The current sensing element (i.e. a resistor) is connected to the system load in series. By the current sensing element, a load current flowing through the system load is converted into a corresponding load voltage. The voltage conversion circuit is connected to the current sensing element. According to the load voltage, the voltage conversion circuit generates a control voltage. The charging current adjusting circuit is arranged in a charging path of the power source to charge the chargeable battery. Moreover, the charging current adjusting circuit is connected to the voltage conversion circuit. According to the control voltage, the charging current provided from the power source to the chargeable battery is adjusted by the charging current adjusting circuit. From the above discussions, the controlling device disclosed in Taiwanese Patent Publication No. TW440760 is capable of detecting the change of the system load in real time, thereby correspondingly adjusting the supplied charging current. Consequently, the charging speed is accelerated.

For example, if the system load is heavier, the charging current adjusting circuit generates a lower charging current to charge the chargeable battery. On the other hand, if the system load is lighter, the charging current adjusting circuit generates a higher charging current to charge the chargeable battery, so that the charging speed is accelerated.

From the above discussions, the current sensing element, the voltage conversion circuit and the charging current adjusting circuit are additionally installed in the electronic device to adjust the charging current. These components not only occupy much space of the electronic device but also increase the fabricating cost of the electronic device.

Therefore, there is a need of providing a cost-effective charging control circuit for adjusting the magnitude of the charging current.

SUMMARY OF THE INVENTION

An object of the present invention provides a cost-effective charging control circuit for adjusting the magnitude of the charging current.

In accordance with an aspect of the present invention, there is provided a charging control circuit. The charging control circuit is installed in an electronic device and connected with a chargeable battery of the electronic device for charging the chargeable battery. The charging control circuit includes a charging module, a switch element, a load detecting element, and an adjusting element. The charging module is connected with the chargeable battery, and provides a charging current to the chargeable battery so as to charge the chargeable battery. The switch element is connected with the charging module. When the switch element is turned on, a control current is outputted from the switch element to the charging module. The load detecting element is connected with the chargeable battery. The load detecting element issues a load range signal according to a voltage drop of the chargeable battery. The adjusting element is connected with the switch element and the load detecting element. The adjusting element issues a control voltage to the switch element according to the load range signal, so that a magnitude of the control current from the switch element is correspondingly adjusted. Moreover, as the voltage drop increases, the charging current increases.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technology, the present invention provides a cost-effective charging control circuit.

Figure 1:
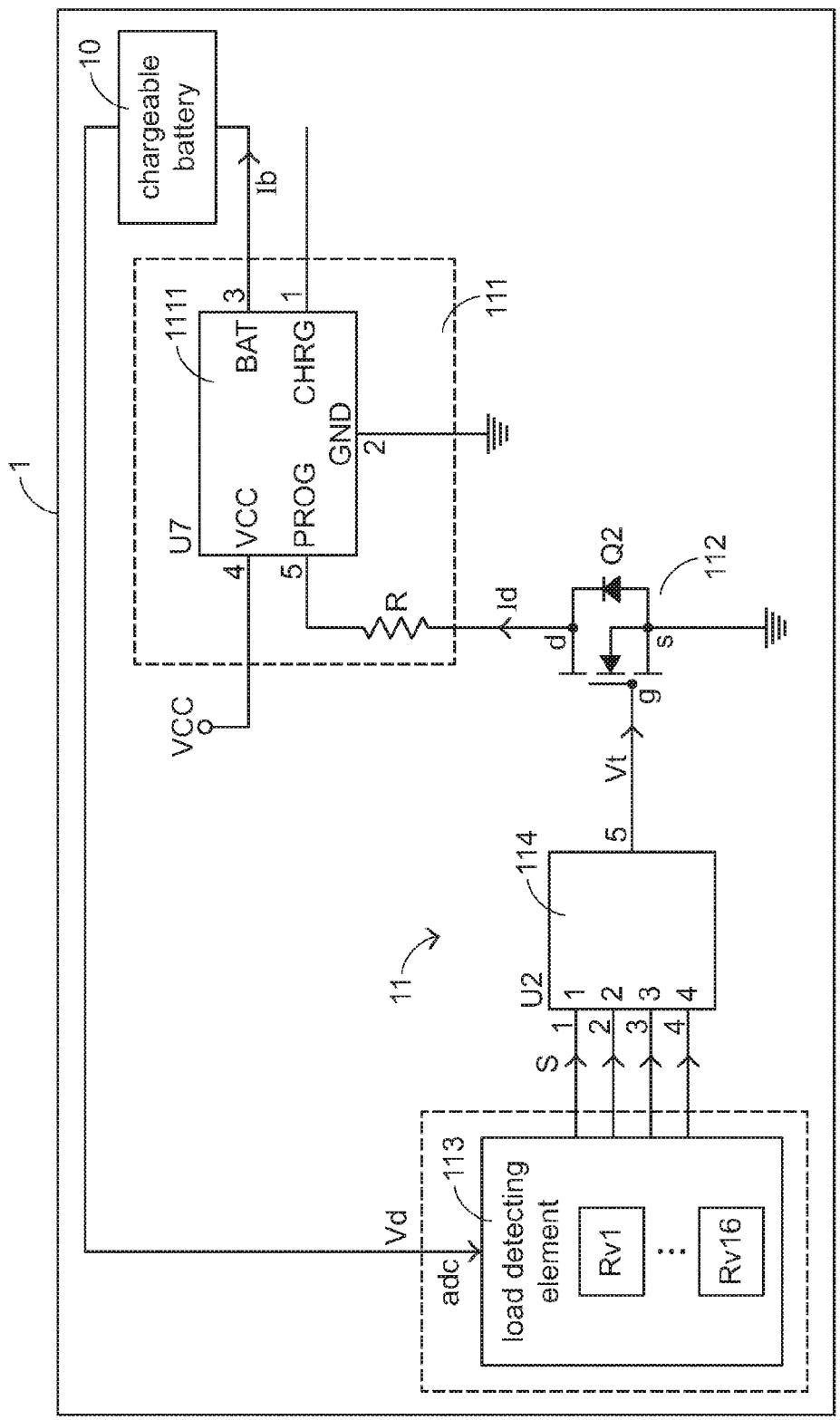
FIG. 1 is a schematic circuit diagram illustrating a charging control circuit according to a first embodiment of the present invention.

Hereinafter, a charging control circuit of the present invention will be illustrated with reference to FIG. 1. FIG. 1 is a schematic circuit diagram illustrating a charging control circuit according to a first embodiment of the present invention. In FIG. 1, an electronic device 1 is shown. The electronic device 1 comprises a chargeable battery 10 and a charging control circuit 11. The chargeable battery 10 is used for providing electric power. By acquiring the electric power, the electronic device 1 can be normally operated. The charging control circuit 11 is installed in the electronic device 1. Moreover, the charging control circuit 11 is connected with the chargeable battery 10 for charging the chargeable battery 10. During operations of the electronic device 1, the chargeable battery 10 outputs a voltage drop Vd. The voltage drop Vd denotes an output voltage difference of the chargeable battery 10. In case that the electronic device 1 is vigorously operated, the output voltage of the chargeable battery 10 may decrease from 5V to 3V. Under this circumstance, since the voltage drop Vd is larger, it means that the power consumption is larger. Whereas, in case that the electronic device 1 is power-off state, the output voltage of the chargeable battery 10 may decrease from 4V to 3.9V. Under this circumstance, the lowest voltage drop Vd indicates that the power consumption is the lowest. According to the magnitude of the voltage drop Vd, the charging speed of the chargeable battery 10 is controlled by the charging control circuit 11. The operations of the charging control circuit 11 will be illustrated in more details as follows.

The charging control circuit 11 comprises a charging module 111, a switch element 112, a load detecting element 113, and an adjusting element 114. The charging control circuit 11 is connected with the chargeable battery 10 for providing a charging current Ib to the chargeable battery 10. The switch element 112 is connected with the charging module 111. When the switch element 112 is turned on, a control current Id is outputted from the switch element 112 to the charging module 111. The load detecting element 113 is connected with the chargeable battery 10 through a pin, which is indicated as "adc" in FIG. 1. According to the voltage drop Vd of the chargeable battery 10, the load detecting element 113 issues a load range signal S. The adjusting element 114 is connected with the switch element 112 and the load detecting element 113. According to the load range signal S, the adjusting element 114 issues a control voltage Vt to the switch element 112. Consequently, the magnitude of the control current Id from the switch element 112 is correspondingly adjusted. Generally, as the control current Id increases, the charging current Ib from the charging module 111 increases.

The charging module 111 comprises a fixed resistor R and a charging control element 1111. The fixed resistor R is connected with the adjusting element 114 in series. The control current Id may flow through the fixed resistor R. The charging control element 1111 is connected with the chargeable battery 10 through a third pin, which is indicated as "3" in FIG. 1. The charging control element 1111 is connected with the fixed resistor R through a fifth pin, which is indicated as "5" in FIG. 1. According to the control current Id, the charging control element 1111 generates the charging current Ib and issues the charging current Ib to the chargeable battery 10. The charging control element 1111 is connected with a voltage source VCC through a fourth pin, which is indicated as "4" in FIG. 1. Consequently, the charging control element 1111 can be normally operated. A gate terminal g of the switch element 112 is connected with the adjusting element 114. A drain terminal d of the switch element 112 is connected with the fixed resistor R. A source terminal s of the switch element 112 is connected to ground. In this embodiment, the charging control element 1111 is a charging integrated circuit, and the switch element 112 is an N-type metal-oxide-semiconductor field-effect transistor (NMOSFET).

Moreover, plural voltage ranges are previously stored in the load detecting element 113. In this embodiment, sixteen voltage ranges Rv1~Rv16 are previously stored in the load detecting element 113. After the voltage drop Vd is received by the load detecting element 113, the load detecting element 113 judges that the voltage drop Vd lies in a target voltage range of the sixteen voltage ranges Rv1~Rv16. Consequently, the load range signal S corresponding to the target voltage range is generated by the load detecting element 113. As shown in FIG. 1, the load detecting element 113 comprises plural pins (e.g. four pins 1~4). In this embodiment, the load detecting element 113 is connected with the adjusting element 114 through the four pins. Each pin of the load detecting element 113 is connected with the adjusting element 114. According to the target voltage range, each pin generates a corresponding logic level signal. The plural logic level signals outputted from the plural pins are collaboratively defined as the load range signal S. For example, if the voltage drop Vd close to zero is received by the load detecting element 113, according to the voltage drop Vd, four low logic level signals (i.e. "0") are outputted from the pins 1~4 of the load detecting element 113, respectively. Consequently, the load range signal S composed of the four low logic level signals is received by the adjusting element 114.

In an embodiment, the plural voltage ranges Rv1~Rv16 are determined according to the range of the voltage drop Vd. For example, in case that the voltage drop Vd from the chargeable battery 10 is in the range between 0V and 4V, the range between 0V and 4V may be divided into sixteen voltage ranges. That is, the voltage range Rv1 is 0~0.25V; the voltage range Rv2 is 0.25~0.5V; the voltage range Rv3 is 0.5~0.75V; the voltage range Rv4 is 0.75~1V; the voltage range Rv5 is 1~1.25 v; the voltage range Rv6 is 1.25~1.5V; the voltage range Rv7 is 1.5~1.75V; the voltage range Rv8 is 1.75~2V; the voltage range Rv9 is 2~2.25V; the voltage range Rv10 is 2.25~2.5V; the voltage range Rv11 is 2.5~2.75V; the voltage range Rv12 is 2.75~3V; the voltage range Rv13 is 3~3.25V; the voltage range Rv14 is 3.25~3.5V; the voltage range Rv15 is 3.5~3.75V; and the voltage range Rv16 is 3.75~4V.

The relationships between the load range signal S composed of plural logic level signals and the plural voltage ranges Rv1~Rv16 will be illustrated by referring to the following table.

| Voltage range | | Pin 1 | Pin 2 | Pin 3 | Pin 4 |
| --- | --- | --- | --- | --- | --- |
| Voltage range Rv1 | → | Logic 0 | Logic 0 | Logic 0 | Logic 0 |
| Voltage range Rv2 | → | Logic 0 | Logic 0 | Logic 0 | Logic 1 |
| Voltage range Rv3 | → | Logic 0 | Logic 0 | Logic 1 | Logic 0 |
| Voltage range Rv4 | → | Logic 0 | Logic 0 | Logic 1 | Logic 1 |
| Voltage range Rv5 | → | Logic 0 | Logic 1 | Logic 0 | Logic 0 |
| Voltage range Rv6 | → | Logic 0 | Logic 1 | Logic 0 | Logic 1 |
| Voltage range Rv7 | → | Logic 0 | Logic 1 | Logic 1 | Logic 0 |
| Voltage range Rv8 | → | Logic 0 | Logic 1 | Logic 1 | Logic 1 |
| Voltage range Rv9 | → | Logic 1 | Logic 0 | Logic 0 | Logic 0 |
| Voltage range Rv10 | → | Logic 1 | Logic 0 | Logic 0 | Logic 1 |
| Voltage range Rv11 | → | Logic 1 | Logic 0 | Logic 1 | Logic 0 |
| Voltage range Rv12 | → | Logic 1 | Logic 0 | Logic 1 | Logic 1 |
| Voltage range Rv13 | → | Logic 1 | Logic 1 | Logic 0 | Logic 0 |
| Voltage range Rv14 | → | Logic 1 | Logic 1 | Logic 0 | Logic 1 |
| Voltage range Rv15 | → | Logic 1 | Logic 1 | Logic 1 | Logic 0 |
| Voltage range Rv16 | → | Logic 1 | Logic 1 | Logic 1 | Logic 1 |

In this embodiment, the plural voltage ranges Rv1~Rv16 are related to sixteen kinds of load range signals S that are outputted from the four pins of the load detecting element 113, and the load range signal S is a four-bit signal. It is noted that the kinds of load range signals S and the bit number of the load range signal S are not restricted. For example, in some other embodiments, two pins of the load detecting element are used to generate four kinds of 2-bit load range signals corresponding to four voltage ranges. More especially, according to the practical requirements, n pins of the load detecting element may be used to generate $2^n$ kinds of n-bit load range signals corresponding to $2^n$ voltage ranges.

Please refer to FIG. 1 again. When the control voltage Vt is transmitted from the adjusting element 114 to the switch element 112, an open width of a channel of the switch element 112 is adjusted by the adjusting element 114 according to the control voltage Vt. Consequently, the control current Id flows through the channel and issues to the charging module 111. Generally, as the control voltage Vt increases, the open width of the channel increases, and the control current Id increases. In this embodiment, the load detecting element 113 is an analog-to-digital converter, and the adjusting element 114 is a digital-to-analog converter. Moreover, the load detecting element 113 is included in a microprocessor, and the adjusting element 114 is disposed outside the microprocessor and connected with the microprocessor.

The operating conditions of the charging control circuit 11 will be illustrated in more details as follows. During operations of the electronic device 1, if the voltage drop Vd from the chargeable battery 10 is very low (e.g. the chargeable battery 10 is 0.2V), the very low voltage drop Vd will be received by the load detecting element 113. According to the above table, the load detecting element 113 judges that the voltage drop Vd lies in the voltage range Rv1. That is, the voltage range Rv1 is the target voltage range. Under this circumstance, all of the four pins 1~4 issue the low logic level signals (i.e. "0"). Consequently, the load range signal S from the load detecting element 113 is constituted by the four bits of logic level signals (i.e. the logic value "0000").

After the load range signal S (i.e. the logic value "0000") is received by the adjusting element 114, the control voltage Vt corresponding to the load range signal S is outputted from the adjusting element 114 to the switch element 112. Consequently, the voltage at the gate terminal of the switch element 112 is equal to the control voltage Vt. According to the characteristics of the switch element 112, the open width of the channel of the switch element 112 increases with the increasing control voltage Vt. Under this circumstance, since the open width of the channel of the switch element 112 is the smallest, the lowest channel current flows through the channel, and the lowest control current Id flows through the fixed resistor R and issues to the charging control element 1111. Afterwards, according to the magnitude of the control current Id, the corresponding charging current Ib is outputted from the pin 3 of the charging control element 1111. Consequently, the chargeable battery 10 is charged by the lowest charging current Ib.

Moreover, the lowest charging current Ib is defined as a default initial current of the charging control element 1111. The magnitude of the initial current is at least higher than or equal to 100 mA. If the initial current for charging the chargeable battery 10 is too low (e.g. 80 mA or less), the charging efficacy of the charging control element 1111 is insufficient. Since the initial current is at least higher than or equal to 100 mA, the charging efficacy of the charging control element 1111 is not impaired.

In case that the electronic device 1 is vigorously operated, the power consumption increases, and thus the voltage drop Vd is larger. Consequently, the larger voltage drop Vd (e.g. 3.2V) will be received load detecting element 113. According to the above table, the load detecting element 113 judges that the voltage drop Vd lies in the voltage range Rv13. That is, the voltage range Rv13 is the target voltage range. Under this circumstance, both of the pins 1 and 2 issue high logic level signals (i.e. "1") and both of the pins 3 and 4 issue low logic level signals (i.e. "0"). Consequently, the load range signal S from the load detecting element 113 is constituted by the four bits of logic level signals (i.e. the logic value "1100").

After the load range signal S (i.e. the logic value "1100") is received by the adjusting element 114, the control voltage Vt corresponding to the load range signal S is outputted from the adjusting element 114 to the switch element 112. According to the control voltage Vt, the open width of the channel of the switch element 112 is widened. Consequently, the channel current flowing through the channel is increased, and the higher control current Id flows through the fixed resistor R and issues to the charging control element 1111. Afterwards, according to the magnitude of the control current Id, the corresponding charging current Ib is outputted from the pin 3 of the charging control element 1111. Consequently, the chargeable battery 10 is charged by the higher charging current Ib (e.g. 450 mA).

In an embodiment, the highest charging current Ib of the charging control element 1111 is set to 500 mA. In case that the voltage drop Vd from the chargeable battery 10 is higher than 4V, the charging current of the charging control element 1111 is still the highest charging current (e.g. 500 mA). Under this circumstance, since the load current of the electronic device 1 is not too high, the possibility of burning out or damaging the electronic device 1 will be minimized.

In the above embodiment, plural voltage ranges are previously stored in the charging control circuit. According to the voltage drop of the chargeable battery, the load detecting element may judge that the voltage drop lies in a specified voltage range and generates the corresponding load range signal to the adjusting element. According to the load range signal, the adjusting element issues a control voltage. According to the control voltage, the switch element is turned on, and the magnitude of the control current from the switch element is correspondingly adjusted. Afterwards, by the charging module, the charging current corresponding to the control current is provided to charge the chargeable battery. Consequently, the magnitude of the charging current is controlled according to the operating situation of the electronic device, and the charging speed is changed. As known, the general electronic device that is chargeable is equipped with the charging module, and the microprocessor of the electronic device comprises the analog-to-digital converter. In other words, for fabricating the charging control circuit of the present invention, it is only necessary to additionally install the adjusting element and the switching element in the electronic device. Since the components of the adjusting element and the switching element are usually very cheap, the charging control circuit of the present invention has low fabricating cost. In other word, the charging control circuit of the present invention is cost-effective.

Figure 2:
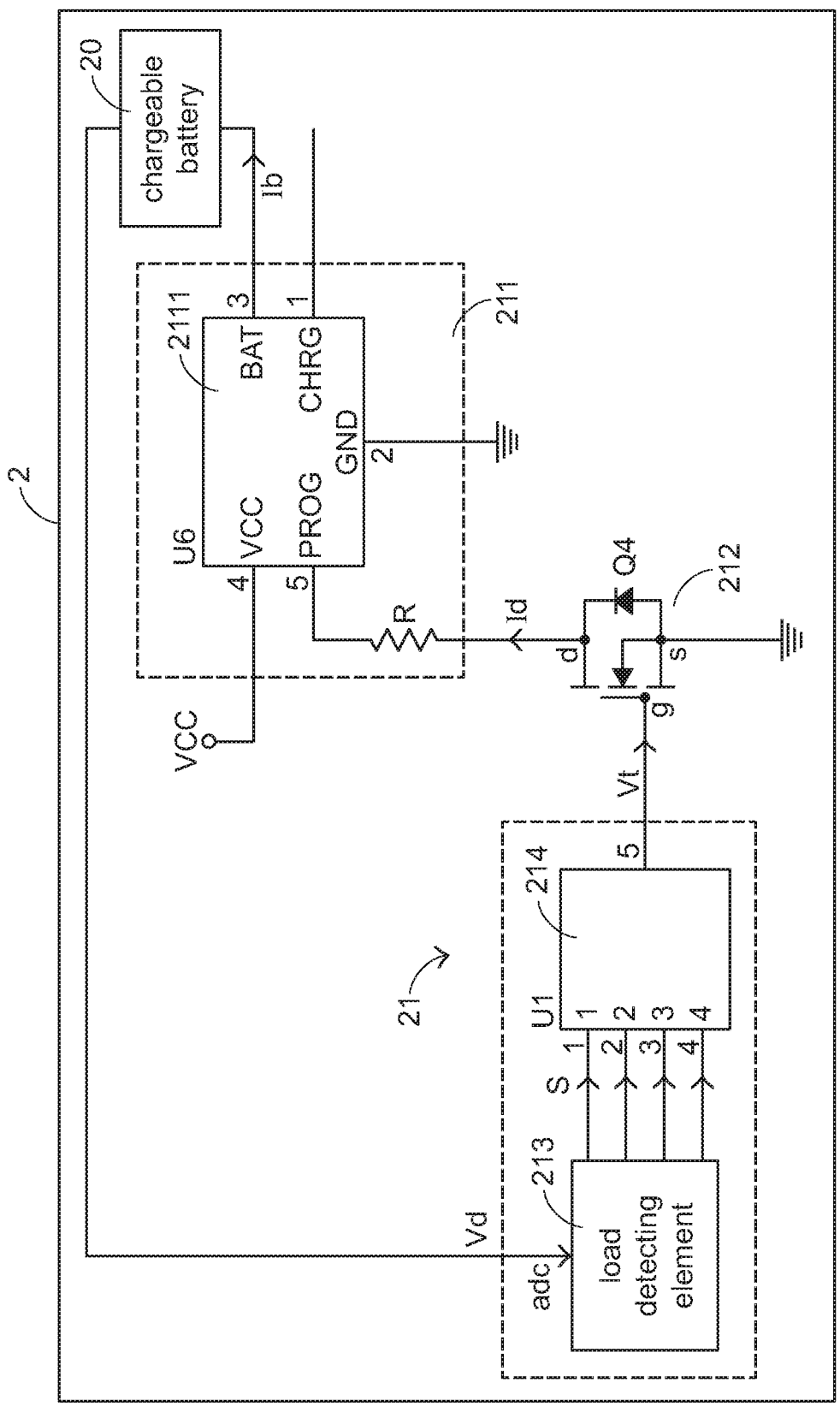
FIG. 2 is a schematic circuit diagram illustrating a charging control circuit according to a second embodiment of the present invention.

The present invention further provides a second embodiment, which is distinguished from the first embodiment. FIG. 2 is a schematic circuit diagram illustrating a charging control circuit according to a second embodiment of the present invention. In FIG. 2, an electronic device 2 is shown. The electronic device 2 comprises a chargeable battery 20 and a charging control circuit 21. The charging control circuit 21 comprises a charging module 211, a switch element 212, a load detecting element 213, and an adjusting element 214. The charging module 211 comprises a fixed resistor R and a charging control element 2111. The structure and the operations of the chargeable battery 20 are similar to those of the chargeable battery 10 of the first embodiment, and are not redundantly described herein. In comparison with the first embodiment, the structure of the charging control circuit 21 of this embodiment is distinguished. The structure of the charging control circuit 21 will be illustrated in more details as follows.

Except for the following two aspects, the operations of the charging module 211, the switch element 212, the load detecting element 213 and the adjusting element 214 of this embodiment are substantially identical to those of the first embodiment, and are not redundantly described herein. In accordance with the first distinguished aspect, a gate terminal g of the switch element 212 is connected with the adjusting element 214, a drain terminal d of the switch element 212 is connected with the fixed resistor R, and a source terminal s of the switch element 212 is connected to ground. In this embodiment, the switch element 212 is a P-type metal-oxide-semiconductor field-effect transistor (PMOSFET). Although the P-type metal-oxide-semiconductor field-effect transistor is used as the switch element 212, the operations of the switch element 212 are similar to those of the switch element 112. In accordance with the second distinguished aspect, the load detecting element 213 is an analog-to-digital converter, the adjusting element 214 is a digital-to-analog converter, and the load detecting element 213 and the adjusting element 214 are integrated into a high-level microprocessor. The operations of the charging control circuit 21 of this embodiment are substantially identical to those of the first embodiment, and are not redundantly described herein.

In the above embodiment, the magnitude of the charging current is controlled by the charging control circuit of the present invention according to the operating situation of the electronic device, and the charging speed is correspondingly adjusted. As known, the general electronic device that is chargeable is equipped with the charging module. In case that the high-level microprocessor is used in the electronic device, the functions of the analog-to-digital converter and the digital-to-analog converter are both achieved. Under this circumstance, for fabricating the charging control circuit of the present invention, it is only necessary to additionally install the switching element in the electronic device. Consequently, the process of assembling the charging control circuit of the present invention is simplified.

From the above descriptions, the magnitude of the charging current is controlled by the charging control circuit of the present invention according to the voltage drop of the chargeable battery. As the voltage drop increases, the charging current increases. Since the charging control circuit of the present invention is capable of adjusting the charging speed, the charging efficiency can be maintained at the satisfied level. Since most of the components of the charging control circuit of the present invention have been already installed in the electronic device, for fabricating the charging control circuit of the present invention, it is only necessary to additionally install the adjusting element and the switching element in the electronic device or additionally install the switching element in the electronic device. Since the number of components is reduced, the charging control circuit of the present invention can be assembled more easily. Moreover, since the additional component is cheap, the charging control circuit of the present invention is cost-effective.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A charging control circuit installed in an electronic device and connected with a chargeable battery of the electronic device for charging the chargeable battery, the charging control circuit comprising:
   a charging module connected with the chargeable battery, and providing a charging current to the chargeable battery so as to charge the chargeable battery;
   a switch element connected with the charging module, wherein when the switch element is turned on, a control current is outputted from the switch element to the charging module;
   a load detecting element connected with the chargeable battery, wherein the load detecting element issues a load range signal according to a voltage drop of the chargeable battery; and
   an adjusting element connected with the switch element and the load detecting element, wherein the adjusting element issues a control voltage to the switch element according to the load range signal, so that a magnitude of the control current from the switch element is correspondingly adjusted, wherein as the voltage drop increases, the charging current increases.

2. The charging control circuit according to claim 1, wherein plural voltage ranges are previously stored in the load detecting element, wherein after the voltage drop is received by the load detecting element, the load detecting element judges that the voltage drop lies in a target voltage range of the plural voltage ranges, and generates the load range signal corresponding to the target voltage range.

3. The charging control circuit according to claim 2, wherein the load detecting element comprises plural pins, wherein the plural pins are connected with the adjusting element, and plural logic level signals are respectively outputted from the plural pins according to the target voltage range, wherein the plural logic level signals outputted from the plural pins are collaboratively defined as the load range signal.

4. The charging control circuit according to claim 1, wherein when the control voltage is transmitted from the adjusting element to the switch element, an open width of a channel of the switch element is adjusted by the adjusting element according to the control voltage, so that a channel current of the channel flows through the channel and the control current is outputted to the charging module, wherein as the control voltage increases, the open width of the channel increases, the channel current flowing through the channel increases, and the control current increases.

5. The charging control circuit according to claim 1, wherein the charging module comprises:
   a fixed resistor connected with the adjusting element in series, wherein the control current flows through the fixed resistor; and
   a charging control element connected with the chargeable battery and the fixed resistor, wherein according to the control current, the charging control element generates the charging current and issues the charging current to the chargeable battery.

6. The charging control circuit according to claim 5, wherein a gate terminal of the switch element is connected with the adjusting element, a drain terminal of the switch element is connected with the fixed resistor, and a source terminal of the switch element is connected to ground, wherein the switch element is an N-type metal-oxide-semiconductor field-effect transistor.

7. The charging control circuit according to claim 5, wherein a gate terminal of the switch element is connected with the adjusting element, a drain terminal of the switch element is connected with the fixed resistor, and a source terminal of the switch element is connected to ground, wherein the switch element is a P-type metal-oxide-semiconductor field-effect transistor.

8. The charging control circuit according to claim 1, wherein the load detecting element is an analog-to-digital converter, and the adjusting element is a digital-to-analog converter, wherein the load detecting element and the adjusting element are integrated into a microprocessor.

9. The charging control circuit according to claim 1, wherein the load detecting element is an analog-to-digital converter, and the adjusting element is a digital-to-analog converter, wherein the load detecting element is included in a microprocessor, and the adjusting element is disposed outside the microprocessor and connected with the microprocessor.

* * * * *